(12) United States Patent
Tee et al.

(10) Patent No.: US 7,965,649 B2
(45) Date of Patent: Jun. 21, 2011

(54) APPARATUS AND METHOD FOR FEEDBACK OF SUBCARRIER QUALITY ESTIMATION IN AN OFDM/OFDMA SYSTEM

(75) Inventors: Lai King Tee, Dallas, TX (US); Cornelius van Rensburg, Dallas, TX (US); Joseph R. Cleveland, Murphy, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 1358 days.

(21) Appl. No.: 11/267,685

(22) Filed: Nov. 4, 2005

(65) Prior Publication Data

US 2007/0104087 A1 May 10, 2007

(51) Int. Cl.
*H04L 12/28* (2006.01)

(52) U.S. Cl. ............... 370/252; 370/328; 455/550.1; 702/69

(58) Field of Classification Search ............... 702/69
See application file for complete search history.

(56) References Cited

U.S. PATENT DOCUMENTS

| | | | |
|---|---|---|---|
| 7,209,460 B2 * | 4/2007 | Fitzek et al. | 370/329 |
| 7,599,698 B2 * | 10/2009 | Cheng et al. | 455/452.2 |
| 2002/0119781 A1 * | 8/2002 | Li et al. | 455/450 |
| 2002/0191535 A1 * | 12/2002 | Sugiyama et al. | 370/208 |
| 2004/0171359 A1 * | 9/2004 | Tirkkonen et al. | 455/127.1 |
| 2005/0025039 A1 * | 2/2005 | Hwang et al. | 370/206 |
| 2005/0031047 A1 * | 2/2005 | Maltsev et al. | 375/260 |
| 2005/0068884 A1 * | 3/2005 | Yoon et al. | 370/203 |
| 2005/0105589 A1 * | 5/2005 | Sung et al. | 375/130 |
| 2005/0128993 A1 * | 6/2005 | Yu et al. | 370/342 |
| 2005/0197065 A1 * | 9/2005 | Tamaki et al. | 455/42 |
| 2005/0207367 A1 * | 9/2005 | Onggosanusi et al. | 370/315 |
| 2005/0245266 A1 * | 11/2005 | Viero et al. | 455/450 |
| 2005/0286451 A1 * | 12/2005 | Kim et al. | 370/310 |
| 2005/0289256 A1 * | 12/2005 | Cudak et al. | 710/62 |
| 2006/0023745 A1 * | 2/2006 | Koo et al. | 370/468 |
| 2006/0079240 A1 * | 4/2006 | Fitzek et al. | 455/450 |
| 2006/0094435 A1 * | 5/2006 | Thomas et al. | 455/450 |
| 2006/0223449 A1 * | 10/2006 | Sampath et al. | 455/69 |
| 2006/0251180 A1 * | 11/2006 | Baum et al. | 375/260 |
| 2006/0255989 A1 * | 11/2006 | Kim et al. | 341/120 |
| 2006/0287743 A1 * | 12/2006 | Sampath et al. | 700/90 |
| 2007/0008943 A1 * | 1/2007 | Grant et al. | 370/342 |

* cited by examiner

*Primary Examiner* — Daniel J Ryman
*Assistant Examiner* — Brian Roberts

(57) ABSTRACT

A method for subcarrier quality estimation in a wireless network is disclosed. The method comprises analyzing characteristics of at least some of the subcarriers of a first signal, creating feedback data based on the analyzed characteristics, wherein the quantity of the feedback data is less than the quantity of all of a plurality of measured signal-to-interference and noise power ratio (SINR) values of each subcarrier of the first signal, and transmitting the feedback data.

31 Claims, 5 Drawing Sheets

APPARATUS AND METHOD FOR FEEDBACK OF SUBCARRIER QUALITY ESTIMATION IN AN OFDM/OFDMA SYSTEM

TECHNICAL FIELD OF THE INVENTION

The present application relates generally to wireless networks and, more specifically, to an apparatus and method for efficient feedback of subcarrier signal quality estimation.

BACKGROUND OF THE INVENTION

In a wireless environment, it is desirable to measure and maintain the quality of the carrier signals. In systems with multiple subcarriers, such as orthogonal frequency division multiplexing (OFDM) and orthogonal frequency division multiple access (OFDMA) systems, it is advantageous to determine the quality levels of each of the subcarriers. One of the existing methods is to feedback the channel quality information of each subcarrier directly, as in the case of the wired technologies of ADSL/VDSL, in which the channel variation is relatively slow. In contrast, in a highly time-varying mobile wireless channel, the direct feedback of channel quality information is inefficient and incurs significant overhead because of the higher number of subcarriers and the need to update the information more frequently.

Therefore, there is a need in the art for an improved wireless network that includes a system and method for efficient and effective feedback of subcarrier quality estimation in OFDM and OFDMA systems.

SUMMARY OF THE INVENTION

A method for the feedback of subcarrier quality estimations in a wireless network is provided. The method comprises analyzing characteristics of at least some of the subcarriers of a first signal, creating feedback data based on the analyzed characteristics, wherein the quantity of the feedback data is less than the quantity of all of a plurality of measured signal-to-interference and noise power ratio (SINR) values of each subcarrier of the first signal, and transmitting the feedback data.

A subscriber station capable of communicating in a wireless network is also provided. The subscriber station comprises a transceiver and a processor. The subscriber station is further configured to receive a signal, the signal comprising multiple subcarriers, to analyze characteristics of at least some of the subcarriers of the signal, to create feedback data according to the analyzed characteristics, and to transmit the feedback data, wherein the feedback data is a function of the measured signal-to-interference power ratio (SINR) value of each subcarrier.

A wireless base station is also provided. The wireless base station comprises at least one transceiver and a controller. The at least one transceiver is operable to receive feedback data from a subscriber station, the feedback data characterizing a signal-to-interference and noise power ratio (SINR) of at least some of a plurality of subcarriers of a first OFDM signal sent by the transceiver to the subscriber station, and to transmit a second OFDM signal to the subscriber station wherein parameters such as the transmission power, or modulation and coding format, of each subcarrier of the second OFDM signal is based on a plurality of estimated subchannel or subcarrier SINR values. The scheduling of user transmissions in each subcarrier or subband may also be dependent on the estimated subcarrier or subchannel SINR values. The controller is operable to determine the estimated SINR of each of the subcarriers of the first OFDM signal based on the feedback data.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION OF THE INVENTION

Figure 1:
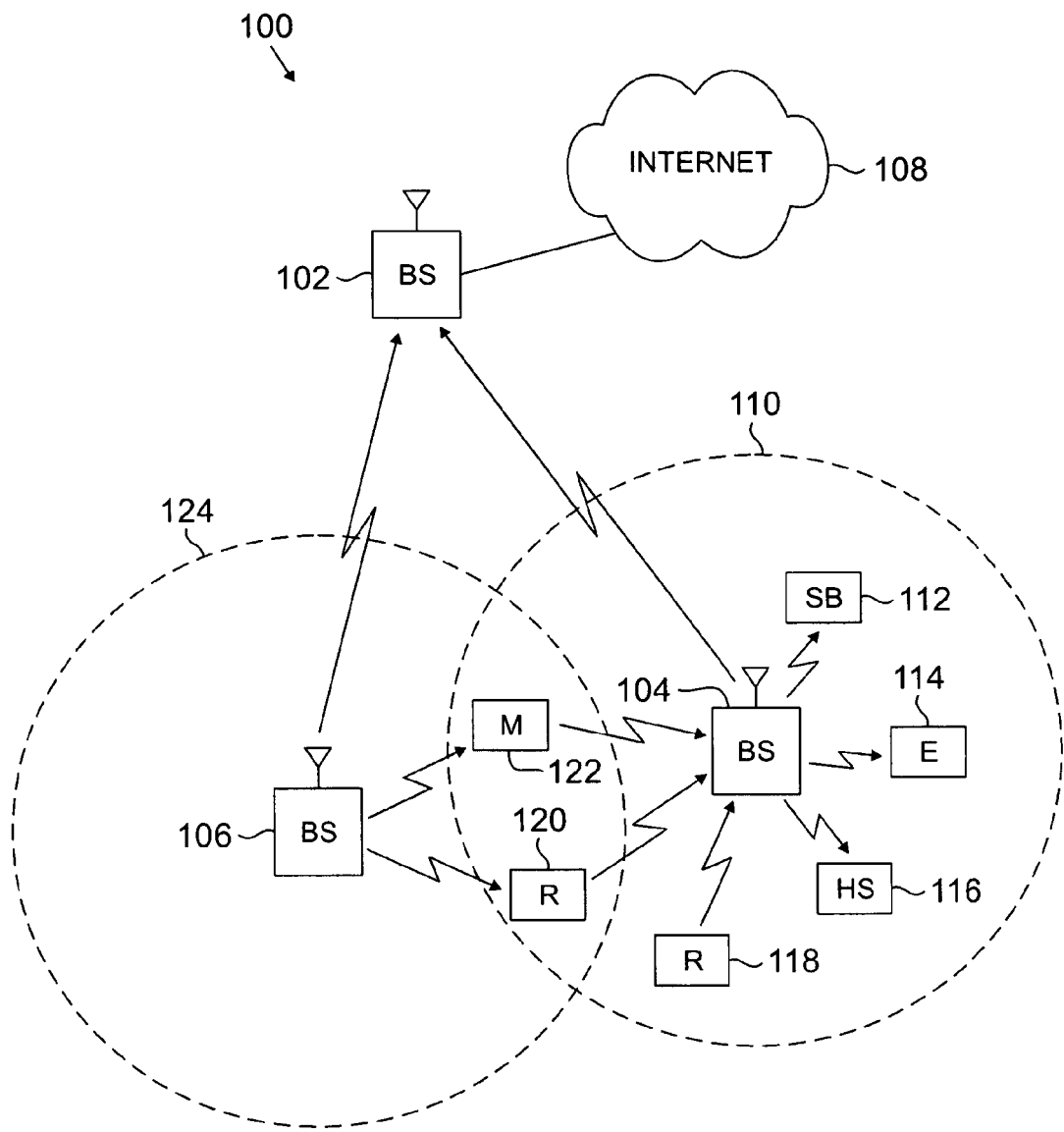
FIG. 1 illustrates an exemplary wireless network that is suitable for subcarrier characteristic analysis and feedback in subscriber stations (SSs) according to the several embodiments of the present disclosure.

FIGS. 1 through 5, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless network.

In an orthogonal frequency division multiplexing (OFDM) communication system or an orthogonal frequency division multiple access (OFDMA) communication system, such as that illustrated and described below, performance can be optimized when water-filling can be accomplished ideally, according to Information Theory. In order to achieve the performance gain through water-filling, it is desirable that the transmitter knows the quality of each subcarrier. This information is estimated by the receiver and then fed back to the transmitter. After the transmitter receives this information, it is able to allocate transmission power to each subcarrier in proportion to the quality of the subcarrier, i.e., signal to interference and noise power ratio. This achieves an increase in performance. Besides water-filling, link adaptation can be applied by loading subcarriers with the optimum modulation and coding scheme, based on the quality of the subcarrier as indicated by the SINR feedback. Furthermore, user transmission scheduling can be performed to maximize the system throughput through multi-user diversity in the frequency domain.

The feedback of channel quality information by the receiver consumes bandwidth on the reverse link that might otherwise be used to communicate content. This lost bandwidth may be referred to as overhead. Overhead increases as the amount of information being fed back increases. In the case of a large number of subcarriers, this overhead may consume significant power and bandwidth on the reverse link channel.

In a typical OFDMA system, such as IEEE-802.16e, there may be as many as 2048 subcarriers, including the unused DC and guard subcarriers. In an exemplary embodiment, the used subcarriers, including pilot and data subcarriers, may be divided into 32 subchannels. Within each subchannel, there may be 48 subcarriers, as in one of the symbol structures supported by the standard. If the estimated signal-to-interference and noise power ratio (SINR) for each data subcarrier is fed back, then there may be $N_{SC}$=1536 floating-point values to be transmitted. Thus, the current standard supports the feedback of subchannel quality instead, as a more practical but suboptimal approach. Predetermined random sequences are transmitted as pilot tones or preambles to assist the mobile station to measure and estimate the quality of the subcarriers. The parameter C/I (carrier-to-interference ratio) has also been used instead of the SINR parameter to describe subcarrier/channel qualities.

The present disclosure includes a system and method for efficient and effective feedback of subcarrier quality estimation information in an OFDM/OFDMA system. Various embodiments include different methods to describe the instantaneous variations in the subcarrier quality. Depending on the model that is used to describe the real-time variations, a small set of parameters is fed back to the transmitter. The transmitter can then reconstruct the variations of the subcarriers based on this knowledge from the feedback. Consequently, the transmitter will be able to allocate power to individual subcarriers or groups of subcarriers, adapt the modulation and coding scheme, or schedule user transmissions in different subcarriers (or subchannels), without consuming all of the reverse link resources needed to receive a complete set of carrier-to-interference values.

In one method described below, the number of coefficients to be fed back is (n+2) for an $n^{th}$ order polynomial, including the order of the polynomial and the coefficient values. This number is typically smaller than the number of subcarriers.

In other methods described below, the number of parameters to be fed back is less than 10. In another method, even though the order list contains ($N_{SC}$−1) values, each of which is represented by $\log_2 N_{SC}$ bits, the number of bits to be fed back may be less than the number of bits for direct feedback of SINR values for each subcarrier. In this case, the number of bits is less because the subsequent order list that is fed back does not contain the complete order list but only the change in the order, if any. This is possible for channel environments that have slower variations with time.

In still another described method, SINR parameters of small groups of subcarriers are fed back, whereby the number of parameters is reduced by a factor k that is equivalent to the number of subcarriers in the group. The subcarriers in each group have similar SINR values.

Another described method uses compression techniques such that the number of bits that provide feedback data on the SINR parameters is reduced by the compression ratio of the algorithm used.

Various embodiments provide a mechanism for the transmitter and receiver to select a method for subcarrier SINR feedback, depending on the actual channel fading environment. Therefore, the system can adaptively or selectively choose a method to optimize its performance in different channel environments.

FIG. 1 illustrates an exemplary wireless network 100 that is suitable for subcarrier characteristic analysis and feedback in subscriber stations (SSs) according to the several embodiments of the present disclosure. In an embodiment, the wireless network 100 includes a first base station 102 that is in communication with a second base station 104 and a third base station 106. The first base station 102 is in communication with an Internet 108 or other data network (not shown).

The second base station 104 provides wireless broadband access to the Internet 108, via the first base station 102, to a first plurality of subscriber stations (SSs) within a coverage area 110 of the second base station 104. In an alternate embodiment, multiple base stations can be connected to the Internet. The first plurality of subscriber stations includes a first SS 112 in a small business, a second SS 114 in an enterprise, a third SS 116 in a WiFi hotspot, a fourth SS 118 in a first residence, a fifth SS 120 in a second residence, and a sixth SS 122 in a mobile device.

The third base station 106 provides wireless broadband access to the Internet 108, via the first base station 102, to a second plurality of subscriber stations within a coverage area 124 of the third base station 106. The second plurality of subscriber stations includes subscriber station 120 and subscriber station 122.

In other embodiments, the first base station 102 may be in communication with either fewer or more base stations. Furthermore, while only six subscriber stations have been depicted in FIG. 1 to avoid cluttering the drawing, it is understood that wireless network 100 may provide wireless broadband access to additional subscriber stations. It is noted that SS 120 and SS 122, associated with the second residence and the mobile device respectively, are on the edge of the two coverage areas 110 and 124. SS 120 and SS 122 may each communicate with both base station 104 and base station 106 and may be said to be operating in handoff, as known to those of skill in the art.

In an embodiment, the base stations 102, 104, and 106 may communicate with each other and with subscriber stations 112, 114, 116, 118, 120, 122 using an IEEE-802.16 wireless metropolitan area network standard, such as, for example, an IEEE-802.16e standard. In another embodiment, however, a different wireless protocol may be employed, such as, for example, a HIPERMAN wireless metropolitan area network standard. Base station 102 may communicate through either direct line-of-sight or non-line-of-sight with base station 104 and base station 106, depending on the type of transmission technology used. Base station 104 and base station 106 may each communicate through non-line-of-sight with the subscriber stations 112, 114, 116, 118, 120, and 122 using OFDM and/or OFDMA techniques.

Base station 104 may provide a T1 level service to SS 114 associated with the enterprise and a fractional T1 level service to SS 112 associated with the small business. Base station 104 may provide wireless backhaul for SS 116 associated with the WiFi hotspot, which may be located in an airport, café, hotel, or college campus. Base station 104 may provide digital subscriber line (DSL) level service to subscriber stations 118, 120, and 122.

Subscriber stations 112, 114, 116, 118, 120, and 122 may use the broadband access to the Internet 108 to access voice, data, video, video teleconferencing, and/or other broadband services. In one embodiment, one or more of subscriber stations 112, 114, 116, 118, 120, and 122 may be associated with an access point (AP) of a WiFi WLAN. SS 122 may be any of a number of mobile devices, including a wireless-enabled laptop computer, personal data assistant, notebook, handheld device, or other wireless-enabled device. Subscriber stations 118 and 120 may be, for example, a wireless-enabled personal computer, a laptop computer, a gateway, or another device.

Dotted lines show the approximate extents of the coverage areas 110 and 124, which are shown as approximately circular for the purposes of illustration and explanation only. It should be clearly understood that the coverage areas associated with base stations, for example, the coverage areas 110 and 124, may have other shapes, including irregular shapes, depending upon the configuration of the base stations and variations in the radio environment associated with natural and man-made obstructions. Also, the coverage areas associated with base stations are not constant over time and may be dynamic—expanding or contracting or changing shape—based on changing transmission power levels of the base station and/or the SSs, weather conditions, and other factors. In an embodiment, the radius of the coverage areas of the base stations, for example, the coverage areas 110 and 124 of the base stations 104 and 106, may extend in the range from less than 2 kilometers to about fifty kilometers from the base stations.

As is well known in the art, a base station, such as base station 102, 104, or 106, may employ directional antennas to support a plurality of sectors within the coverage area. While in FIG. 1 the base stations 104 and 106 are depicted approximately in the center of their associated coverage areas 110 and 124, in other embodiments, the use of directional antennas may locate the base station near the edge of the coverage area, for example, at the point of a cone-shaped or pear-shaped coverage area.

The connection to the Internet 108 from the base station 102 may comprise a broadband connection, for example, a fiber optic line, to servers located in a central office or another operating company point-of-presence. The servers may provide communication to an Internet gateway for internet protocol-based communications and to a public switched telephone network gateway for voice-based communications. The servers, Internet gateway, and public switched telephone network gateway are not shown in FIG. 1. In another embodiment, the connection to the Internet 108 may be provided by different network nodes and equipment.

According to an embodiment of the present disclosure, base stations 104 and 106 of wireless network 100 are each operable to select one or more of subscriber stations 112, 114, 116, 118, 120, and 122 to poll for Channel Quality Information (CQI) regarding the sub-channels used for communicating with base stations 104 and 106. Based on the CQI received from the polled subscriber stations 112, 114, 116, 118, 120, and 122, each base station 104 and 106 is also operable to assign sub-channels to each one of subscriber stations 112, 114, 116, 118, 120, and 122 in its coverage area for communication. In various disclosed embodiments, in order to avoid the large amount of reverse-channel resources that may be required to provide full SINR values or full carrier-to-interference and noise ratio (CINR) values for each subcarrier or subchannel as a part of CQI, each one of subscriber stations 112, 114, 116, 118, 120, and 122 is capable of analyzing various characteristics of some or all subcarriers and returning feedback data to the base station 104 or 106. The receiving base station 104 or 106 may then determine CQI for some or all subcarriers using the feedback data, which is intended to consume less bandwidth on the reverse channel than does the transmission of full conventional CQI.

Figure 2:
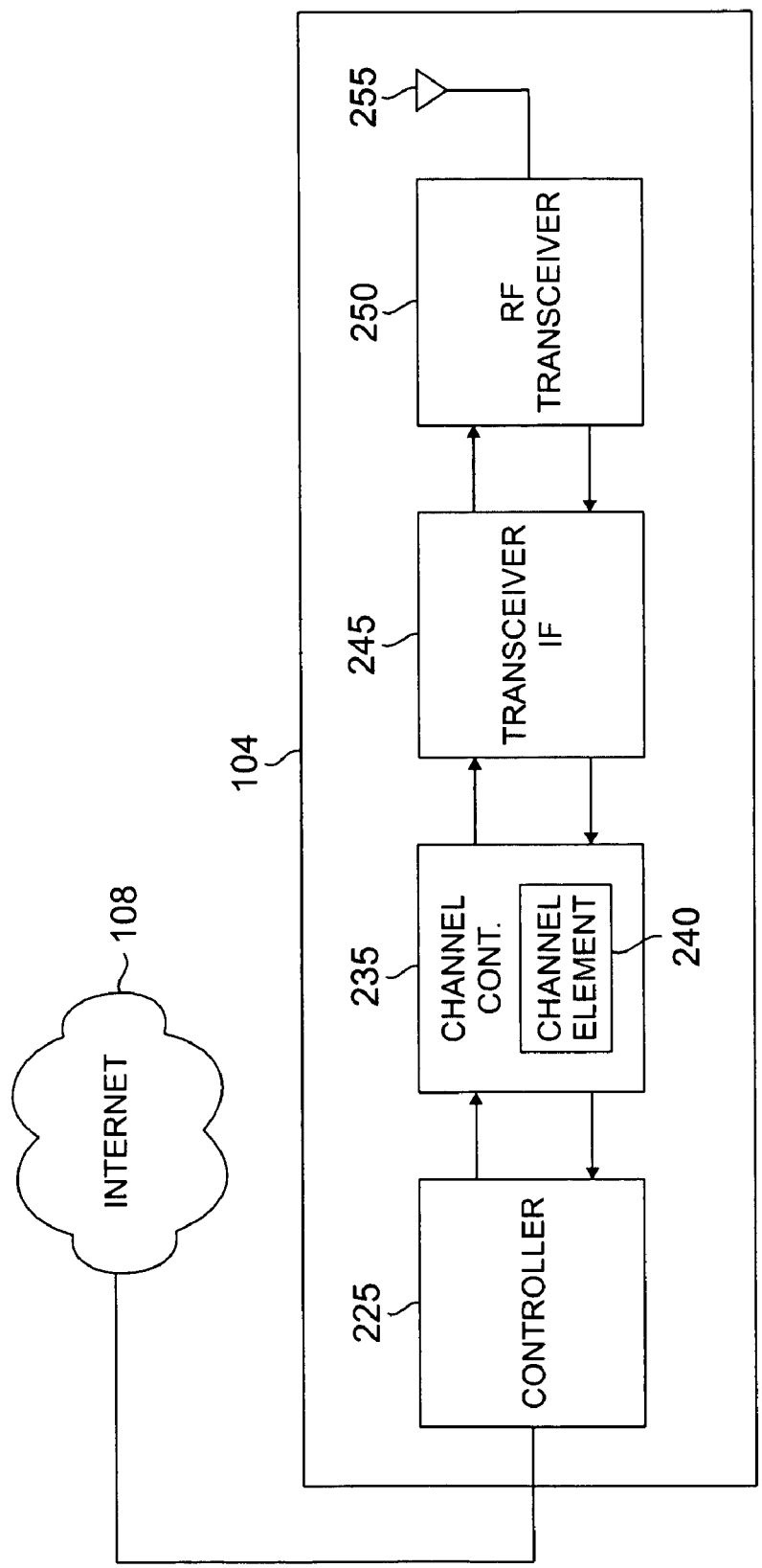
FIG. 2 illustrates an exemplary base station in greater detail according to an exemplary embodiment of the present disclosure.

FIG. 2 illustrates base station 104 in greater detail according to an embodiment of the present disclosure. Base station 104 is illustrated by way of example only. However, it will be understood that the components illustrated and described with respect to base station 104 are also part of base stations 106 and 102. According to one embodiment, base station 104 comprises controller 225, channel controller 235 (which can comprise at least one channel element 240), transceiver interface (IF) 245, radiofrequency (RF) transceiver unit 250, and antenna array 255.

Controller 225 can comprise processing circuitry and memory capable of executing an operating program that controls the overall operation of base station 104. In an embodiment, the controller 225 can be operable to communicate with the Internet 108. Under normal conditions, controller 225 directs the operation of channel controller 235, which may comprise a number of channel elements, such as channel element 240, that are each operable to perform bidirectional communication in the forward channel and the reverse channel. A "forward channel" refers to outbound signals from the base station 104 to subscriber stations 112, 114, 116, 118, 120, and 122 and a "reverse channel" refers to inbound signals from subscriber stations 112, 114, 116, 118, 120, and 122 to base station 104. Transceiver IF 245 transfers bidirectional channel signals between channel controller 235 and RF transceiver unit 250.

Antenna array 255 transmits forward channel signals received from RF transceiver unit 250 to subscriber stations 112, 114, 116, 118, 120, and 122 in the coverage area of base station 104. Antenna array 255 is also operable to send to RF transceiver unit 250 reverse channel signals received from subscriber stations 112, 114, 116, 118, 120, and 122 in the coverage area of the base station 104. According to one embodiment of the present disclosure, antenna array 255 comprises a multi-sector antenna, such as a three-sector antenna in which each antenna sector is responsible for transmitting and receiving in a coverage area corresponding to an arc of approximately 120 degrees. Additionally, RF transceiver unit 250 may comprise an antenna selection unit to select among different antennas in antenna array 255 during both transmit and receive operations.

In various disclosed embodiments, base station 104 is capable of reconstructing the variations of the subcarriers based on feedback data received from subscriber stations, allocating power to individual subcarriers, assigning modulation and coding scheme and scheduling user transmissions in the appropriate subcarriers/subchannels accordingly. Preferably, this processing is performed using controller 225.

Figure 3:
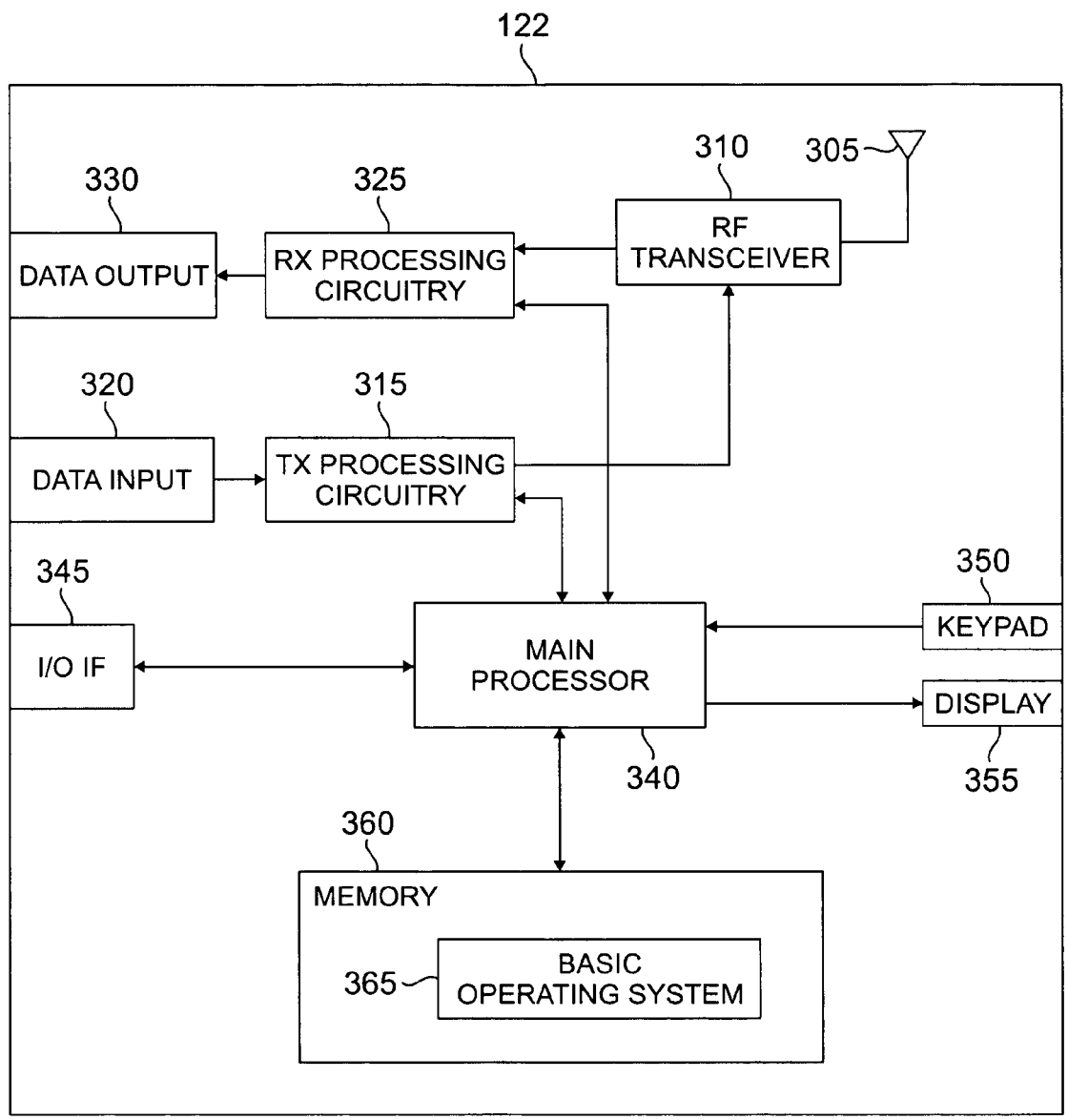
FIG. 3 illustrates a wireless subscriber station according to an advantageous embodiment of the present disclosure.

FIG. 3 illustrates subscriber station 122 in greater detail according to an embodiment of the present disclosure. Ss 122 is illustrated by way of example only. However, it will be understood that the components illustrated and described with respect to SS 122 also may be part of subscriber stations 112, 114, 116, 118, and 120. SS 122 comprises antenna 305, radio frequency (RF) transceiver 310, transmit (TX) processing circuitry 315, data input 320, receive (RX) processing circuitry 325, and data output 330. SS 122 also comprises main processor 340, input/output (I/O) interface (IF) 345, keypad 350, display 355, and memory 360.

RF transceiver 310 receives from antenna 305 an incoming RF signal transmitted by base station (BS) 104. RF transceiver 310 down-converts the incoming RF signal to produce an intermediate frequency (IF) or a baseband signal. The IF or baseband signal may be sent to receiver processing circuitry 325, which produces a processed baseband signal by filtering, decoding, and/or digitizing the baseband or IF signal. Receiver processing circuitry 325 is also operable to transmit the processed baseband signal to data output 330 (e.g., when the processed baseband signal comprises voice data) or to main processor 340 for further processing (e.g., when the processed baseband signal relates to web browsing).

Transmitter processing circuitry 315 receives analog or digital voice data from data input 320 or other outgoing baseband data (e.g., web data, e-mail, interactive video game data and the like) from main processor 340. Transmitter processing circuitry 315 encodes, multiplexes and/or digitizes the outgoing baseband data to produce a processed baseband or IF signal. RF transceiver 310 receives the outgoing processed baseband or IF signal from transmitter processing circuitry 315. RF transceiver 310 up-converts the baseband or IF signal to an RF signal that may be transmitted via antenna 305.

According to one embodiment, main processor 340 may comprise a microprocessor or microcontroller. Memory 360, which is coupled to main processor 340, may comprise a random access memory (RAM) and/or a non-volatile memory (e.g., ROM). Main processor 340 executes basic operating system program 365 stored in memory 360 in order to control the overall operation of SS 122. In one such operation, main processor 340 controls the reception of forward channel signals and the transmission of reverse channel signals by RF transceiver 310, receiver processing circuitry 325, and transmitter processing circuitry 315. Main processor 340 may also execute other processes and programs resident in memory 360 (not shown). Main processor 340 may transfer data into or out of memory 360, as required by an executing process.

Main processor 340 is also coupled to the I/O interface 345. I/O interface 345 provides SS 122 with the ability to connect to other devices, such as laptop computers, handheld computers and the like. I/O interface 345 provides a communication path between these accessories and main processor 340. Main processor 340 is also coupled to keypad 350 and display unit 355. The operator of SS 122 may use keypad 350 to enter data into SS 122. Display 355 may comprise a liquid crystal display capable of rendering text, images, video and/or graphics. It will be understood that additional embodiments may use other types of displays.

The disclosed embodiments include methods to feed back sufficient information from subscriber stations (SSs), for example from SS 122, to the base station 104, such that the reverse-link overhead is minimized or reduced. Instead of transmitting the exact measured carrier-to-interference and noise (C/I) value of each subcarrier directly, implicit information describing the characteristics of subcarrier C/I values in a subchannel can be determined and transmitted. This information includes one or more of the following: level crossing rate (in the subcarrier domain), maximum and minimum C/I values across the subcarriers, envelope variation of the subcarriers, amplitude of the variation and various types of models to describe the variation, such as a linear model, second-order or higher-order polynomial models that allow the transmitter to re-construct the subcarrier C/I instantaneous variations adequately. Other similar techniques are included.

In preferred embodiments, SS 122 and the base station 104 use a signaling method or protocol during synchronization, registration, at regular intervals, or at the beginning of a packet transmission session, to indicate which of the methods will be used and what type of information will be transmitted by the receiver as feedback data to indicate the qualities and variations of the subcarriers, preferably during a CQI polling process. As an example, two signaling bits can be used to select one of four methods, or three signaling bits may be used to select one of eight methods, for communicating channel quality information from the SS 122 to the base station 104. The SS 122 and the base station 104 may determine which method to employ based on characteristics of the radio channel, such as, for example, whether the sequence of signal-to-interference and noise power ratio (SINR) values across subcarriers is highly frequency selective, approximately periodic or monotonically increasing or monotonically decreasing.

In some embodiments, the CQI polling process can be initiated by the base station 104 when it determines that there could be a change in signal quality. In other embodiments, the SS 122 may transmit the subcarrier quality feedback periodically. Similarly, under appropriate circumstances, base station 104 may periodically re-designate the method of feedback and type of feedback data to be sent from SS 122.

Figure 4:
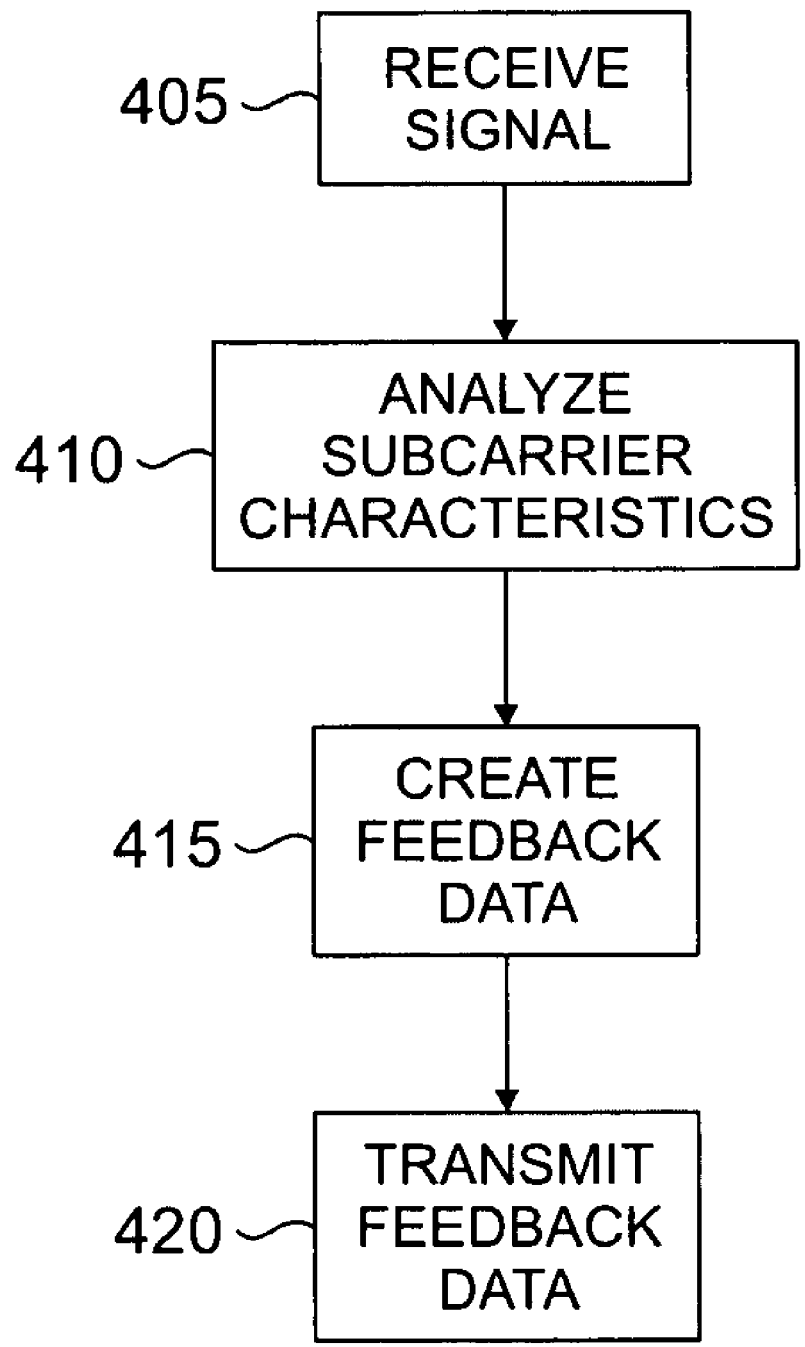
FIG. 4 depicts a flowchart of a process in accordance with an exemplary embodiment of the present disclosure.

FIG. 4 depicts a flowchart of a process in accordance with an exemplary embodiment of the present disclosure, typically, but not necessarily, performed by a subscriber station. Here, the subscriber station 122 or other receiver first receives a signal from a transmitter (step 405), typically a base station such as base station 104, where the signal has multiple subcarriers. In one embodiment, this is an OFDM/OFDMA signal.

Next, the subscriber station, such as subscriber station 122, analyzes the characteristics of at least some, and preferably all, of the subcarriers of the received signal (step 410), preferably using one or more of the methods described below. Analysis may be performed using main processor 340.

Next, the subscriber station creates feedback data corresponding to the subcarrier characteristics (step 415), again using main processor 340. Here, the feedback data may not be the directly measured carrier-to-interference value (or SINR value) of each subcarrier (i.e., not the SINR values for each of all subcarriers), as would be typical in known systems.

Finally, the subscriber station transmits the feedback data to the base station (step 420), using conventional signaling techniques. The base station 104 may then reconstruct the sequence of characteristics of the subcarriers analyzed by the subscriber station 122 and use the information about the subcarriers, for example SINR values, to adjust the signal the base station 104 sends to the subscriber station 122. For example, the base station 104 may adjust a power transmission level of each of the subcarriers of the signal based on the feedback information.

The subcarrier characteristics can be analyzed using one or more of the methods described below, as required by base station 104 or SS 122. A first method, Method 1, approximates the sequence of quality indications, for example SINR values, of the subcarriers within a subchannel by a polynomial function sequence. In a first example, the polynomial function sequence may be a first order polynomial and hence a linear sequence. According to this method, let $SINR_i$ be the signal to interference and noise power ratio of the i-th subcarrier, $i=1, \ldots, N_{sc}$, where $N_{sc}$ is the number of subcarriers. Then, $SINR_i = \alpha_0 + \alpha_1 * i$, where Let $\begin{bmatrix} \alpha_0 \\ \alpha_1 \end{bmatrix} = \hat{\underline{\alpha}}$, $\hat{\underline{\alpha}} = (X^T X)^{-1} X^T \underline{y}$, where $X = \begin{bmatrix} 1 & 1 \\ 1 & 2 \\ \vdots & \vdots \\ 1 & N_{SC} \end{bmatrix}$, $\underline{y} = \begin{bmatrix} \text{SINR}_1 \\ \text{SINR}_2 \\ \vdots \\ \text{SINR}_{N_{SC}} \end{bmatrix}$, $N_{SC}$ = No. of Subcarriers In this case, only the values of $\alpha_0$ and $\alpha_1$ are transmitted from the subscriber station 122 to the base station 104. The base station 104 may then reconstruct or estimate the sequence of quality indications using the linear polynomial defined by $\alpha_0$ and $\alpha_1$. This method could be applicable in a slightly frequency selective fading channel environment.

A similar approach can be followed to approximate the sequence of quality indications more closely using higher order polynomials. In the general case of an N-th order polynomial sequence:

$$\text{SINR}_i = \alpha_0 + \alpha_1 i + \alpha_2 i^2 + \ldots + \alpha_N i^N$$

The feedback information will include the coefficients of the polynomial, namely $\alpha_0, \alpha_1, \ldots, \alpha_N$. The base station 104 may then reconstruct or estimate the sequence of quality indications using the N-th order polynomial defined by the coefficients of the polynomial, $\alpha_0, \alpha_1, \ldots, \alpha_N$, included in the feedback information.

Order N of the polynomial can be selected depending on the tradeoff between the desired complexity versus accuracy in the approximation. The number of bits per coefficient can be selected depending on the trade-off between polynomial accuracy and impact on overhead. One method to determine the coefficients of the N-th order polynomial, the values of $\alpha_k$, is:

$$X = \begin{bmatrix} 1^0 & \cdots & 1^n \\ \vdots & \ddots & \vdots \\ N_{SC}^0 & \cdots & N_{SC}^n \end{bmatrix}, \hat{\underline{\alpha}} = \begin{bmatrix} \alpha_0 \\ \vdots \\ \alpha_n \end{bmatrix} \Rightarrow \hat{\underline{\alpha}} = (X^T X)^{-1} X^T \underline{y}$$

If the sequence of quality indications of the subcarriers within a subchannel cannot be satisfactorily modeled using the above described polynomial method, other methods can be used.

A second method, Method 2, determines a threshold value of the sequence of quality indications, for example SINR values, of the subcarriers within a subchannel, for example, a mean SINR value, and a crossing rate with respect to the subcarrier domain, of the sequence of quality indications crossing the threshold. The second method may also determine an average of maximum quality indications and an average of minimum quality indications. The crossing rate, the average maximum, the average minimum, an index or other reference of one particular threshold crossing quality value and the sense of crossing (positive going or negative going) may be included in the feedback data.

The base station 104 may use the crossing rate, average maximum, average minimum, particular threshold crossing index and the sense of the reference crossing to determine an estimated periodic sequence. The periodic sequence determined by the base station 104 may be used to estimate the sequence of quality indications, for example SINR values, of the subcarriers within the subchannel. The base station 104 may also use any of several known methods to perform curve fitting. In an embodiment, the sequence of estimated quality indications between determined local maximums and minimums may trace approximately a straight line. In another embodiment, the sequence between determined local maximums and minimums may trace portions of approximately sinusoidal curves. The local maximums and local minimums may be about the average maximum and the average minimum, respectively.

In this method, instead of using a polynomial for approximation, the feedback term uses a representation of the level crossing rate with respect to the subcarrier domain. This can be used when there is a periodic variation in the subcarrier quality indications, for example SINR values, across the subchannel. A desirable threshold value can be selected for the reference level for computing the level-crossing rate in the subcarrier domain. This reference level may also be the mean of the subcarrier SINR values within the subchannel. In other words, the number of subcarriers with SINR values that are above or below the reference level is the inverse of the level-crossing rate in the subcarrier domain. Alternatively, the mean of the subcarrier SINR values across the whole channel bandwidth may be used as the reference level instead.

The level crossing information may be employed to identify or characterize fade "duration" and fade depth of the wireless channel. Note that the terms fade duration and fade depth used here are borrowed from time domain analysis. This terminology is applied to the subcarrier domain as an analogy, as will be understood by those of skill in the art. In this context, fade duration measures the number of consecutive subcarriers with SINR values below a selected threshold value. Fade depth information can include subcarrier SINR values that are below a certain threshold. The fade duration and fade depth are used as part of the feedback data from subscriber station 122 to base station 104.

A third method, Method 3, includes determining the local maximums and local minimums of subcarrier qualities, for example, the SINR values, within a subchannel, and providing the local maximums and local minimums paired with the indices of the associated subcarriers as feedback data from the subscriber station 122 to the base station 104. The base station 104 may then extrapolate between the local maximums and local minimums to construct or to estimate the subcarrier qualities, for example, the SINR values of the subcarriers within the subchannel.

Figure 5:
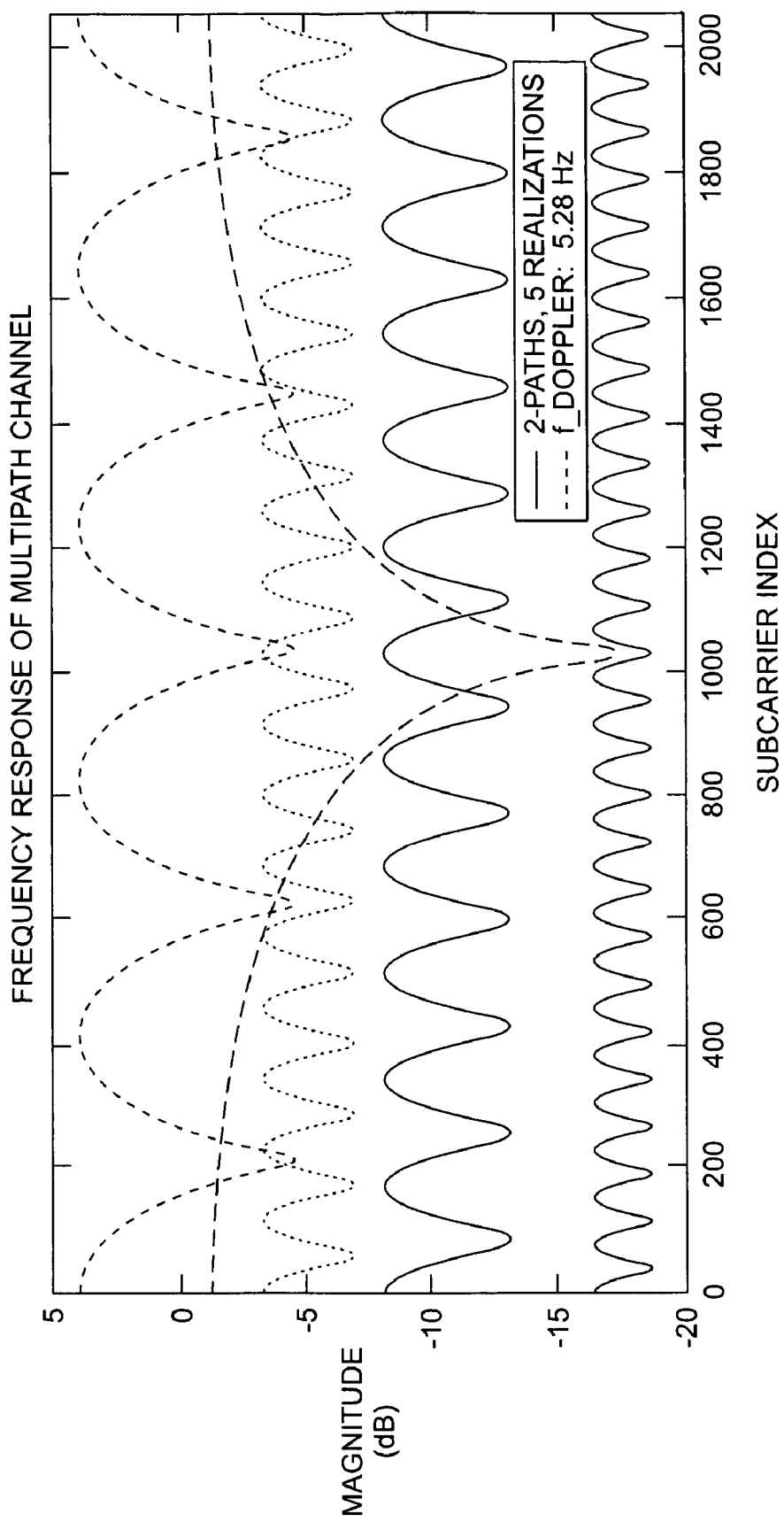
FIG. 5 depicts a graph of the frequency responses of different multipath channel profiles with relatively slow fading, in accordance with an exemplary embodiment of the present disclosure.

A fourth method, Method 4, includes determining a sorted list of subcarrier numbers or indices, in ascending or descending order of SINR values, to be used as part of the feedback data from subscriber station 122 to base station 104. FIG. 5 depicts a graph of the frequency responses of different multipath channel profiles with relatively slow fading, in accordance with an exemplary embodiment of the present disclosure. FIG. 5 indicates how a transmitted signal may vary in the frequency domain, as affected by the channel frequency selectivity. However, variations in the SINR also depend on the received interference from other users. Thus, the variations in SINR may follow different patterns depending on a number of factors, such as cell/sector loading, scheduling and transmission power of interfering users in neighboring cells/sectors etc.

As shown in FIG. 5, there could be a smaller variance in the subcarrier SINR fluctuations in a slightly frequency selective fading environment, when the interference has similar frequency characteristics, or is at relatively low level. In this method, the subcarrier SINR values can be sorted in descending order. The feedback data can include this order list (i.e., the subcarrier indices according to their positions on the list), the local maximums, and the local minimums of the subcarrier SINR values. At the base station 104, the sorted SINR values may be reconstructed or estimated based on extrapolating from the local maximums and local minimums and the original unsorted order of SINR values provided based on the order list. The extrapolation can be provided by a linear interpolation between local maximums and minimums. Alternatively, similarly to the first method discussed above, a higher-order polynomial can be used to approximate the variation of the subcarrier SINR values within the sorted list. In this case, in addition to the feedback of local maximum and local minimum values of the sorted subcarrier SINR values, the feedback information sent to base station 104 may also contain the coefficients of the polynomial model. The base station 104 may then restore the original unsorted order of the estimated subcarrier SINR values using the order list.

This method can be further modified when applied to the case in which there is a small variance in subcarrier SINR fluctuation. In that case, the order list may be shortened. For example, if the SINR of subcarriers decreases monotonically in the order: {1, 2, . . . , 512}, then it may be sufficient to send a list as: {1, 2, 512} with the protocol pre-defining that the missing subcarrier numbers imply a list of consecutive subcarriers.

A fifth method, Method 5, includes the subscriber station 122 segmenting the subcarrier set into groups. SS 122 then determines a quadratic correction term (n=2) to each subset. As a part of feedback data to base station 104, SS 122 sends group number and quadratic correction terms.

A sixth method, Method 6, employs various compression techniques to reduce the volume of data used to communicate the feedback data from the subscriber station 122 to the base station 104. These compression techniques may include one or more of Huffman coding, Shannon coding, Arithmetic coding, Lempel-Ziv coding, and/or delta coding. The sixth method may be used alone, for example, by application to the set of measured SINR values of the subcarriers of a subchannel. Alternatively, the sixth method may be used in combination with the other methods described above to reduce the volume of data to communicate the feedback data from the subscriber station 122 to the base station 104.

The sixth method includes subscriber station 122 treating the level of each subcarrier as a source data point and using data source compression techniques, e.g., Huffman codes, Shannon codes, Arithmetic codes, Lempel-Ziv coding, delta coding, JPEG or MPEG, to convey the information to the base station 104 in a compressed format.

A seven method, Method 7, can be particularly advantageous when the sub-channel consists of many sub-carriers. In this case, it may be more efficient for the subscriber station 122 to use the following method:

1. Estimate the SINR frequency domain fluctuations;
2. Perform the Inverse Fast Fourier Transform (IFFT) to calculate the SINR time domain components;
3. Threshold the time domain components and ignore all values below the threshold; and
4. Feed back the magnitudes and indexes of the time domain components; and Base station 104 will then do the reverse process to determine the subcarrier SINR values for link adaptation, such as bit loading, power allocation, or user scheduling.

While several embodiments have been provided in the present disclosure, it should be understood that the disclosed systems and methods may be embodied in many other specific forms without departing from the spirit or scope of the present disclosure. The exemplary embodiments disclosed are to be considered as illustrative and not restrictive, and the intention is not to be limited to the details given herein. It is intended that the disclosure encompass all alternate forms within the scope of the appended claims along with their full scope of equivalents.

What is claimed is:

1. A method for subcarrier quality estimation in a wireless network, comprising:
   communicating with a base station to select one of a plurality of techniques for creating feedback data;
   analyzing characteristics of at least some of a plurality of subcarriers of a first signal;
   using the selected technique, creating the feedback data based on the analyzed characteristics, wherein the quantity of the feedback data is less than the quantity of all of a plurality of signal-to-interference and noise power ratio (SINR) values of each subcarrier of the first signal; and
   transmitting the feedback data,
   wherein the plurality of techniques comprises determining an N-th order polynomial approximation of a sequence of the SINR values of each of the at least some subcarriers of the first signal, the N-th order polynomial approximation having N+1 coefficients, N greater than or equal to two, and transmitting as feedback the N+1 coefficients.

2. The method of claim 1, further including:
   receiving a second signal comprising a plurality of subcarriers, wherein at least one of 1) a transmission power of at least one subcarrier of the second signal, 2) a modulation and coding scheme of at least one subcarrier of the second signal, and 3) a user scheduling of at least one subcarrier of the second signal is based on the feedback data.

3. The method of claim 2, wherein the creating feedback data and the transmitting the feedback data is done more often than once per minute within a coverage area of a base station.

4. The method of claim 1, wherein the first signal is an orthogonal frequency division multiplexing (OFDM) signal in a wireless network.

5. The method of claim 1, wherein analyzing characteristics includes determining fade duration and fade depth, wherein fade duration measures the number of consecutive subcarriers with SINR values below a first selected threshold value and fade depth includes subcarrier SINR values that are below a second selected threshold value.

6. The method of claim 1, wherein analyzing characteristics includes determining a rate that a SINR value of at least a portion of the subcarriers of the first signal crosses a threshold and wherein the feedback data includes the threshold, the threshold crossing rate, and an index of a subcarrier SINR that crosses the threshold.

7. The method of claim 6, wherein the threshold is the mean value of the SINR values of the at least some of the subcarriers of the first signal.

8. The method of claim 1, wherein analyzing characteristics includes sorting the at least some subcarriers according to the SINR values of the at least some subcarriers of the first signal.

9. The method of claim 8 wherein the feedback data includes a sort order of the at least some subcarriers, a maximum SINR value, and a minimum SINR value.

10. The method of claim 8 wherein analyzing characteristics includes determining a polynomial approximation of a sequence of the SINR values of the sorted subcarriers of the first signal, the polynomial approximation defined by N+1 of coefficients, and wherein the feedback data includes the sorted order of the sorted subcarriers and the N+1 coefficients.

11. The method of claim 1, wherein analyzing characteristics includes determining maximum and minimum SINR values of the at least some subcarriers of the first signal and maintaining an indication of a plurality of corresponding subcarrier indices, and wherein the feedback data includes the maximum and minimum SINR values and the corresponding subcarrier indices.

12. The method of claim 1, wherein analyzing characteristics includes segmenting the at least some subcarriers of the first signal into a plurality of groups, determining, for each group, a second order polynomial approximation of a sequence of the SINR values of the subcarriers of the group, and wherein the feedback data includes three constants defining the polynomial approximation for each of the plurality of groups of subcarriers.

13. The method of claim 1, wherein analyzing characteristics includes treating the SINR values of the at least some subcarriers of the first signal as a corresponding source data and using data source compression techniques to compress the SINR values, and wherein the feedback data includes the compressed SINR values.

14. The method of claim 13 wherein the data source compression techniques are selected from the group consisting of Huffman code compression techniques, Shannon code compression techniques, arithmetic code compression techniques, Lempel-Ziv coding compression techniques, JPEG compression techniques, and MPEG compression techniques.

15. The method of claim 1, wherein analyzing characteristics includes representing the SINR values of the at least some subcarriers of the first signal using data compression techniques, and wherein the feedback data includes the compressed SINR values.

16. The method of claim 15 wherein the data compression techniques are selected from the group consisting of Huffman code compression techniques, Shannon code compression techniques, arithmetic code compression techniques, and Lempel-Ziv coding compression techniques.

17. The method of claim 1, wherein analyzing characteristics includes estimating SINR frequency domain fluctuations in the at least some subcarriers, performing an inverse fast Fourier transform to calculate a plurality of SINR time domain components, comparing the plurality of SINR time domain components to a threshold, and eliminating all of the plurality of SINR time domain components below the threshold.

18. The method of claim 1, wherein selecting one of a plurality of techniques comprises selecting one of the following:
calculating coefficients of a polynomial;
determining a crossing rate of a threshold;
calculating a local maximum or local minimum;
calculating a result using a data compression technique; and
determining a result from an estimation method.

19. A subscriber station capable of communicating in a wireless network, comprising:
a transceiver; and
a processor, wherein the subscriber station is configured to:
receive a signal, the signal comprising multiple subcarriers,
communicate with a base station to select one of a plurality of techniques for creating feedback data,
analyze characteristics of at least some of the subcarriers of the signal,
use the selected technique to create feedback data according to the analyzed characteristics, and
transmit the feedback data, wherein the feedback data is not a measured signal-to-interference power and noise ratio (SINR) value of each subcarrier,
wherein the plurality of techniques comprises determining an N-th order polynomial approximation of a sequence of the SINR values of the at least some subcarriers of the signal, the N-th order polynomial approximation having N+1 coefficients, N greater than or equal to two, and transmitting as feedback the N+1 coefficients.

20. The subscriber station of claim 19, wherein analyzing characteristics includes determining a rate that a SINR value of at least a portion of the at least some subcarriers of the signal crosses a threshold and wherein the feedback data includes the threshold, the threshold crossing rate, and an index of a subcarrier SINR value that crosses the threshold.

21. The subscriber station of claim 19, wherein analyzing characteristics includes sorting the at least some subcarriers according to a plurality of SINR values of the at least some subcarriers of the signal and determining the N-th order polynomial approximation of the sequence of the SINR values of the sorted subcarriers of the signal, the polynomial approximation defined by a number N+1 of coefficients, and wherein the feedback data includes the sorted order of the sorted subcarriers and the N+1 coefficients.

22. The subscriber station of claim 19, wherein analyzing characteristics includes segmenting the at least some subcarriers of the signal into a plurality of groups, determining, for each group, a second order polynomial approximation of a sequence of the SINR values of the subcarriers of the group, and wherein the feedback data includes three constants defining the polynomial approximation for each of the groups of subcarriers.

23. The subscriber station of claim 19, wherein analyzing characteristics includes using data source compression techniques to compress a plurality of SINR values of the signal, and wherein the feedback data includes the compressed SINR values.

24. The subscriber station of claim 23 wherein the data source compression techniques are selected from the group consisting of Huffman code compression techniques, Shannon code compression techniques, arithmetic code compression techniques, Lempel-Ziv coding compression techniques, JPEG compression techniques, and MPEG compression techniques.

25. A wireless base station, comprising:
at least one transceiver operable to receive feedback data from a subscriber station, the feedback data characterizing signal-to-interference power ratio (SINR) values of at least some of a plurality of subcarriers of a first orthogonal frequency division multiplexing (OFDM) signal sent by the transceiver to the subscriber station, and to transmit a second OFDM signal to the subscriber station wherein at least one of a transmission power, a modulation and a coding scheme of at least one subcarrier of the second OFDM signal is based on a plurality of estimated SINR values; and
a controller operable to determine the estimated SINR value of each of the at least some subcarriers of the first OFDM signal based on the feedback data,
wherein the wireless base station is configured to communicate with the subscriber station to select one of a plurality of techniques for creating the feedback data, the plurality of techniques comprising at least a determination of an N-th order polynomial model of the estimated SINR values of the at least some subcarriers of the first OFDM signal, the N-th order polynomial approximation having N+1 coefficients, N greater than or equal to two, and a transmission of the N+1 coefficients as the feedback data.

26. The wireless base station of claim 25, wherein the feedback data includes an average maximum SINR value, an average minimum SINR value, a threshold SINR value, and a crossing rate of SINR values crossing the threshold SINR value.

27. The wireless base station of claim 26, wherein the controller is further operable to fit the estimated SINR value of each of the at least some subcarriers of the first OFDM signal to a periodic curve defined at least in part by the average maximum SINR value, the average minimum SINR value, the threshold SINR value, and the crossing rate of SINR values crossing the threshold SINR value.

28. The wireless base station of claim 25, wherein the feedback data includes a sort order of subcarriers sorted based on the SINR values of the at least some subcarriers of the first OFDM signal and N+1 coefficients associated with a N-th order polynomial approximating a sequence of sorted SINR values and wherein determining the estimated SINR value of each of the at least some subcarriers of the first OFDM signal is based on determining the sequence of the sorted SINR values based on the N-th order polynomial and rearranging the sequence of the sorted SINR values based on the sort order of sorted subcarriers.

29. The wireless base station of claim 25, wherein the feedback data includes compressed values of the SINR values of the at least some subcarriers, and wherein the estimated SINR values of each of the subcarriers of the first OFDM signal are determined using data source uncompress techniques selected from the group consisting of Huffman code uncompress techniques, Shannon code uncompress techniques, arithmetic code uncompress techniques, Lempel-Ziv coding uncompress techniques, delta coding uncompress techniques, JPEG uncompress techniques, and MPEG uncompress techniques.

30. The wireless base station of claim 25, wherein the feedback data identifies a plurality of groups of subcarriers and three constants defining a polynomial approximation of the SINR values of the at least some subcarriers of each group and wherein determining the estimated SINR values of each of the subcarriers of the first OFDM signal is based on the polynomial approximations.

31. A method for subcarrier quality estimation in a wireless network, comprising:
    communicating with a base station to select one of a plurality of techniques for creating feedback data;
    analyzing characteristics of at least some of a plurality of subcarriers of a first signal;
    using the selected technique, creating the feedback data based on the analyzed characteristics, wherein the quantity of the feedback data is less than the quantity of all of a plurality of signal-to-interference and noise power ratio (SINR) values of each subcarrier of the first signal; and
    transmitting the feedback data,
    wherein the plurality of techniques comprises determining an N-th order polynomial approximation of a sequence of the SINR values of each of the at least some subcarriers of the first signal, the N-th order polynomial approximation having N+1 coefficients, N greater than or equal to two, and transmitting as feedback the N+1 coefficients; and
    wherein each data value in the feedback data comprises a value from at least one of the following groups:
    coefficients of a polynomial;
    a crossing rate of a threshold;
    a local maximum;
    a local minimum;
    a result from a data compression technique; and
    a result from an estimation method.

* * * * *